M. VON ROHR.
OPTICAL SYSTEM.
APPLICATION FILED APR. 30, 1914.
1,143,667.
Patented June 22, 1915.
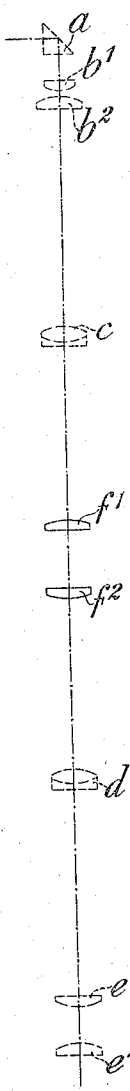

UNITED STATES PATENT OFFICE.

MORITZ VON ROHR, OF JENA, GERMANY, ASSIGNOR TO THE FIRM OF CARL ZEISS, OF JENA, GERMANY.

OPTICAL SYSTEM.

1,143,667.

Specification of Letters Patent.

Patented June 22, 1915.

Application filed April 30, 1914. Serial No. 835,456.

*To all whom it may concern:*

Be it known that I, MORITZ VON ROHR, a citizen of the German Empire, residing at Jena, Germany, have invented a new and useful Optical System, of which the following is a specification.

In the more recent instruments for inspecting cavities in the body several lens systems of reversion are employed for obtaining a larger entrance pupil and thereby an increased luminosity of the image, a collective lens being positioned between each two such systems, which lens is located approximately at the locus of the real image lying between two adjacent systems of reversion. As such a collective lens is only intended to serve the purpose of conveying the rays, so as to render all the rays, which have entered through the entrance pupil of the instrument available for the image presented to the eye, and is to remain otherwise without influence on the formation of the image, the most favorable location for the collective lens would be exactly at the locus of the image. In this case, however, any dirt collected on the surface of the lens, particularly particles of dust, would appear magnified together with the object in the image presented to the observer. In order to avoid this, a comparatively thick lens has been sometimes used as the collective lens, and this lens has been so located that in the interior of this lens there was the locus of a real image. It is difficult, however, with the small lens dimensions, which obtain in the instruments in question, to grind such thick lenses with sufficient accuracy and it was therefore proposed, to form the said lenses of two parts cemented together. As, however, in using the above-mentioned instruments, a slight bending of the containing tube frequently occurs, there is always the danger of the cemented joint coming undone. These drawbacks may be removed according to the invention by dividing the collective lens into two lenses, which are separated by an air space and between which lies the locus of a real image. A simple mode of division and one, therefore, that comes into consideration in the first place in practice, consists in replacing the collective lens by a system consisting of two equal parts, which are positioned symmetrically to the image-locus lying between them. When the instrument tube is reduced at the place to be occupied by the collective system, the division of the latter will be effected hemi-symmetrically to the image-locus. In every case it is recommended to choose the distance of the two lenses from each other at least equal to their diameter.

The annexed drawing shows diagrammatically, as an example of how the invention may be applied, the optical system of a cystoscope having two systems of reversion, the new collective systems being shown in full lines and the other parts in dotted lines.

Behind a reflecting prism $a$ there is an objective consisting of two lenses $b^1$ and $b^2$, which forms in the neighborhood of its lens $b^2$ an image of the interior surface of the bladder. This image is presented by two systems of reversion $c$ and $d$ to an ocular consisting also of two lenses $e^1$ and $e^2$. Between the systems of reversion $c$ and $d$ there is a collective system consisting of two lenses $f^1$ and $f^2$, between which there lies the locus of the real image and which approximately replace a collective lens at the image-locus.

I claim:

1. Optical system for a medical appliance adapted to inspect cavities in the body, comprising a plurality of systems of reversion and a collective system between each two such systems of reversion, each such collective system consisting of two lenses separated from one another by an air space, between which lenses lies the locus of a real image.

2. Optical system for a medical appliance adapted to inspect cavities in the body, comprising a plurality of systems of reversion and a collective system between each two such systems of reversion, each such collective system consisting of two lenses separated from one another by an air space between which lenses lies the locus of a real image, and the diameter of each of the said two lenses being less than the said air space.

MORITZ VON ROHR.

Witnesses:
PAUL KRÜGER,
FRITZ SANDER.